D. McF. MOORE.
AUTOMATIC GAS FEED FOR VACUUM TUBES.
APPLICATION FILED MAY 8, 1906.
930,404.
Patented Aug. 10, 1909.
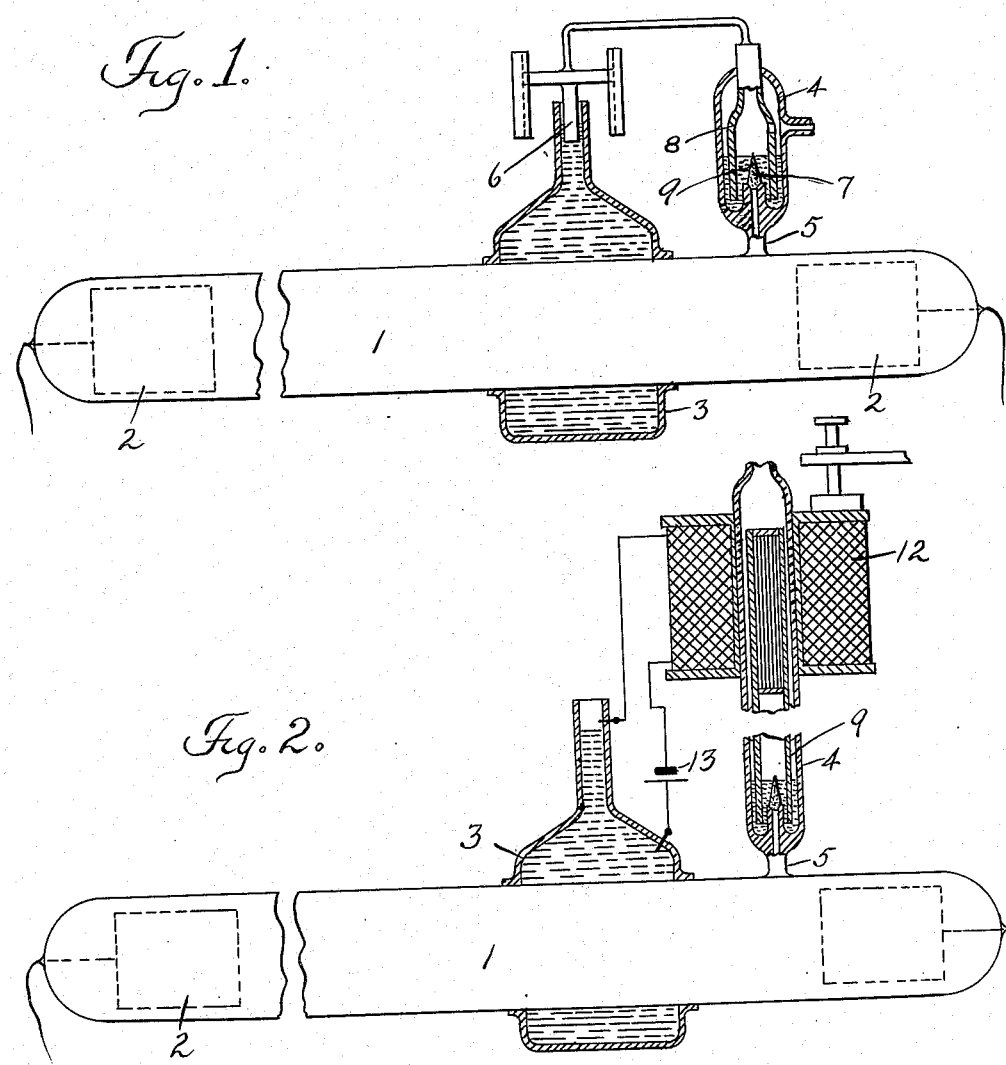
WITNESSES:
INVENTOR
Daniel McFarlan Moore
BY
Townsend & Decker
ATTORNEYS

UNITED STATES PATENT OFFICE.

DANIEL McFARLAN MOORE, OF NEWARK, NEW JERSEY, ASSIGNOR TO MOORE ELECTRICAL CO., OF NEW YORK, N. Y., A CORPORATION OF NEW YORK.

AUTOMATIC GAS-FEED FOR VACUUM-TUBES.

No. 930,404.   Specification of Letters Patent.   Patented Aug. 10, 1909.

Application filed May 8, 1906.   Serial No. 315,731.

To all whom it may concern:

Be it known that I, DANIEL McFARLAN MOORE, a citizen of the United States, and a resident of Newark, in the county of Essex and State of New Jersey, (with post-office address 52 Lawrence street,) have invented certain new and useful Improvements in Automatic Gas-Feed for Vacuum-Tubes, of which the following is a specification.

My present invention relates to that class of devices termed vacuum tubes and which are supplied with electrodes or terminals for causing electric energy to pass through the contained gas or vapor.

The invention is particularly useful for vacuum tube or vapor electric lamps, but may also be applied to vacuum or vapor rectifiers, X-ray tubes, wireless telegraph apparatus or other devices which employ a vacuum through which the electric energy passes.

The object of my invention is to prevent changes in the degree of vacuum due to the passage of the electric energy and consists in an improved means for automatically supplying the gas or vapor to the vacuous spaces so as to maintain the desired gas or vapor tension.

My invention consists essentially in feeding gas to the tube automatically by changes in the heating effect of the contained gas while subjected to the action of the electric energy passing through it.

My invention consists also in the combination with a vacuum tube, of a thermostat exposed to the heat of the electric discharge and means controlled by said thermostat for supplying gas to the vacuum tube in regulated amounts to maintain a constancy of gaseous tension therein.

In carrying out the invention, the supply of gas is preferably afforded by regulating the admission of gas from a body of gas in a chamber or receptacle in which it is maintained at a tension somewhat higher than that of the gas in the vacuum tube.

The thermostat may be of any desired character adapted to take advantage of the principle of expansion and contraction through changes of temperature in it. As an example of such a thermostat, I show, in the accompanying drawings, a suitable receptacle containing mercury which expands with increase of temperature due to the increased heating effect of the electric discharge when the degree of vacuum increases, but I might employ other expansible materials besides mercury and I might employ materials in solid instead of liquid form as will be well understood by those skilled in the art of thermostats, heat gages, etc.

The regulated flow of gas might be controlled by the action of said thermostat upon a suitable valve which controls the admission of the gas to the vacuum tube and as a form of valve that may be employed in carrying out my invention, I show the form described in my prior applications filed Aug. 21st, 1905 and April 16th, 1906, but any other proper form of valve sufficiently delicate and certain in its action might be used.

Referring to the accompanying drawings, Figure 1 is a general side elevation of a form of apparatus embodying my invention. Fig. 2 is a modification.

1 indicates a vacuum tube, as for instance, a vacuum tube employed for electric lighting and provided with the terminal or electrodes 2 that supply energy from any proper source to the contents of the tube for the purpose of rendering said gaseous contents luminous.

3 is a suitable receptacle or holder for a body of mercury which is placed in or surrounds the tube or is in such proximity thereto as to feel directly the changes in heat due to changes in the temperature of the gas in the tube when traversed by the electric energy supplied by the electrodes.

With any decrease of tension of the gaseous contents, the flow of current increases, the temperature of the gas rises and the mercury or other liquid in the heat gage expands. Such expansion is used to operate upon the devices which admit gas to the tube and in such manner that upon an expansion taking place, due to increased heating of the gas, more gas will be admitted and the tension of the gas restored to normal so as to increase the resistance and cut down the heat.

Assuming that a valve of the construction described in my prior application is employed, the expansion of the mercury may act to lift a float 6 directly connected to said valve or to the device which varies the level of the liquid so as to expose the passage through which gas may pass to the vacuum tube.

4 indicates the valve chamber containing gas supplied from any desired source and maintained at a tension higher than that of the gas in the vacuum tube.

5 is a feed pipe which feeds gas to the tube 1. The passage of gas from chamber 4 to pipe 5 is through a plug or mass of porous material 7, which is inserted in the end of tube 5 and which is surrounded by a body of liquid such as mercury. Changes of level of said liquid are used to expose or conceal the pointed tip of the plug 7 in order to control the flow of gas through such porous material to the pipe 5 and tube 1. Normally the tip is more or less concealed beneath the level of the liquid 8 and little or no gas can flow, but when the level falls, the tip is exposed and gas flows in minute amount so as to bring the tension in tube 1 back to normal. Changes of level may be produced by the action of a plunger or displacer 8 directly connected to the float 6, or the movements of the heat gage may be communicated to the valve in any other desired way, and in such manner as to open the valve when the heat increases, thus for instance, as indicated in Fig. 2, the rise of the mercury in the thermostat may close an electric circuit through itself including an electromagnet 12 whose movable core is connected to the plunger 9. The electric current which operates the magnet may be obtained from any desired source 13. As indicated, expansion of the heat gage may be made effective in a tubular extension of the chamber 3, which is of much less caliber than said chamber so as to multiply the effects and get a more delicate action. However, as will be obvious, the effects might be multiplied in other ways and other forms of thermostat be used without departing from my invention.

What I claim as my invention is:

1. The combination of a vacuum tube, a thermostat and means controlled thereby for supplying gas to the tube when the heat of the gas in the tube increases.

2. The combination of a vacuum tube, a thermostat exposed to the direct heat of the gas in the tube and means controlled thereby for supplying gas to the tube when the heat of the gas therein increases.

3. The combination of a vacuum tube lamp, a thermostat exposed to the heat of the lamp and means controlled by said thermostat for supplying gas to the tube, as and for the purpose described.

4. The combination of a vacuum tube, a thermostat exposed to the heat of the electric discharge through the gas of the tube, a gas pipe or passage connected to the tube, a gas valve controlling the admission of gas to the tube through said passage, and means governed by the thermostat for controlling the action of the valve.

5. The combination of a vacuum tube, a thermostat and a gas valve controlling the admission of gas to the tube from a body of gas of greater tension than that in the tube and controlled in its operation by changes in the thermostat due to change in the heat of the gas within the tube.

6. The combination of a valve operating by changes of liquid level, a vacuum tube connected to said valve, a thermostat exposed to the heating effect of the gas in the tube and means controlled by the thermostat for changing the level of the liquid.

7. The combination of a vacuum tube, a gas supply pipe or passage connected to the tube, a valve in said passage having a liquid seal operating by changes of level to close and open its ports, a plunger for changing the level of the liquid and means for operating said plunger through changes in the heating effect of the gas in the vacuum tube.

8. The combination of a vacuum tube and means responsive to changes in the heat of the contained gas for automatically feeding gas to said tube from a body of gas maintained at a higher tension than the gas within the tube.

9. The combination of a vacuum tube, a valve mechanism, an actuating magnet therefor and a thermostat exposed to the heat of the gas in the tube and controlling the circuit of said magnet.

10. The combination of a vacuum tube, a gas feed valve for feeding gas to said tube, an operating magnet and a thermostat exposed to the direct heat of the gas in the tube and controlling the circuit of said magnet.

11. The method of regulating the gaseous tension within a vacuum tube by causing the heat of the gas to act upon an expansible material and employing the effects of expansion to control the flow of a gas to the tube.

Signed at New York in the county of New York and State of New York, this 5th day of May, A. D. 1906.

DANIEL McFARLAN MOORE.

Witnesses:
C. F. TISCHNER, Jr.,
LILLIAN BLOND.